(12) United States Patent
O'Reilly et al.

(10) Patent No.: US 6,550,351 B1
(45) Date of Patent: Apr. 22, 2003

(54) TRANSMISSION RANGE SELECTOR SYSTEM

(75) Inventors: Michael O'Reilly, Holliston, MA (US); William J. Farmer, Amherst; William Hartman Fort, Stratham, both of NH (US); Robert S. Vann Rox, Milford, MA (US); Per I. Karlsson, El Paso, TX (US); Brian Ganter, Foxborough, MA (US)

(73) Assignee: Stoneridge Control Devices, Inc., Canton, MA (US)

( * ) Notice: Subject to any disclaimer, the term of this patent is extended or adjusted under 35 U.S.C. 154(b) by 0 days.

(21) Appl. No.: 09/632,769

(22) Filed: Aug. 4, 2000

Related U.S. Application Data
(60) Provisional application No. 60/147,713, filed on Aug. 6, 1999.

(51) Int. Cl.[7] ............................................... F16H 59/04
(52) U.S. Cl. ...................................... 74/335; 74/473.12
(58) Field of Search ............................. 74/335, 473.3, 74/473.12

(56) References Cited

U.S. PATENT DOCUMENTS

| | | | |
|---|---|---|---|
| 4,022,078 A | * 5/1977 | Malott ....................... 74/473.3 |
| 4,719,419 A | 1/1988 | Dawley ....................... 324/208 |
| 5,243,871 A | 9/1993 | Weiten ...................... 74/473 R |
| 5,269,204 A | 12/1993 | Moroto et al. |
| 5,406,860 A | 4/1995 | Easton et al. ................. 74/335 |
| 5,660,080 A | * 8/1997 | Rector et al. ................. 74/335 |
| 5,671,947 A | 9/1997 | Henn ........................ 280/756 |
| 5,676,620 A | 10/1997 | Ulm et al. ................... 477/115 |
| 5,847,344 A | 12/1998 | Denyer et al. ........... 200/61.88 |
| 5,852,953 A | 12/1998 | Ersoy ..................... 74/473.12 |
| 5,854,458 A | 12/1998 | Ramamurthy et al. ... 200/61.54 |
| 5,899,115 A | 5/1999 | Kataumi et al. ......... 74/473.18 |
| 6,058,682 A | * 5/2000 | McCurley et al. ....... 74/473.12 |
| 6,105,448 A | * 8/2000 | Borschert et al. ............. 74/335 |
| 6,155,126 A | * 12/2000 | Vogt et al. ................... 74/335 |

* cited by examiner

Primary Examiner—Sherry Estremsky
(74) Attorney, Agent, or Firm—Grossman, Tucker, Perreault & Pfleger, PLLC (57) ABSTRACT

A transmission range selector system having a driver interface module, an electronic control module, and an actuator coupleable to an automotive transmission. The driver interface module may be positioned in a plurality of desired transmission gear positions. The desired gear position set at the driver interface module is redundantly sensed by the combination of a rotational position Hall effect sensor and a plurality of discrete position Hall effect sensors. The rotational position Hall effect sensor has a linearly varying output representative of the desired gear position. The Hall effect sensors provide an output to the electronic control module for energizing the actuator to change the transmission gear position to the desired transmission gear set at the driver interface module. The actuator may include multiple motors to provide redundancy and a sensor gear for providing transmission gear position feedback to the electronic control module.

34 Claims, 10 Drawing Sheets

TRANSMISSION RANGE SELECTOR SYSTEM

CROSS REFERENCE TO RELATED APPLICATIONS

This application claims the benefit of co-pending U.S. provisional patent application serial No. 60/147,713 filed Aug. 6, 1999, the teachings of which are incorporated herein by reference.

FIELD OF THE INVENTION

The present invention relates in general to electromechanical actuators, and, in particular to transmission range selection system including an actuator for controlling the gear position of an automotive transmission through a driver interface and an electronic control module.

BACKGROUND OF THE INVENTION

Conventional automobile transmissions are controlled through a gear shift assembly connected to the transmission through a mechanical linkage. The gear shift is normally prominently positioned adjacent the driver's seat for easy access. In a vehicle having either an automatic or a manual transmission, to change the transmission gear position the operator moves the gear shift to a position corresponding to the intended gear position, e.g., park, neutral, drive, reverse, etc.

Unfortunately, known mechanical transmission gear shift assemblies occupy a significant amount of passenger compartment space. Compartment space has always been a valuable commodity in automobile design. With the introduction of new features and technologies to automobiles, compartment space is becoming increasingly valuable.

For example, many automobiles today include cellular phones, computerized global positioning systems, increased storage area, etc. Future automobile designs will likely include full computer displays and associated equipment. All of the equipment related to new technologies introduced into automobile designs must be positioned in the already limited space adjacent the driver's seat. It is recognized, therefore, that reducing the size and space requirements of conventional transmission shift assemblies would be highly beneficial in terms of providing additional space adjacent the driver for the introduction of new equipment.

There is, therefore, a need in the art for a compact, cost-effective, and reliable transmission range selector system that may be conveniently operated and efficiently assembled to an automobile.

SUMMARY OF THE INVENTION

The present invention is organized about the concept providing a compact, cost-effective, and reliable transmission range selector system that may be conveniently operated and efficiently assembled to an automobile. A transmission range selector system consistent with the invention may include a driver interface module, an electronic control module, and an actuator coupleable to an automotive transmission. In one embodiment, the driver interface module may be positioned in a plurality of desired transmission gear positions. The desired gear position set at the driver interface module is redundantly sensed by the combination of a rotational position Hall effect sensor and a plurality of discrete position Hall effect sensors. The rotational position Hall effect sensor may have a linearly varying output representative of the desired gear position. The Hall effect sensors provide an output to the electronic control module for energizing the actuator to change the transmission gear position to the desired transmission gear set at the driver interface module. The actuator may include multiple motors to provide redundancy and a sensor gear for providing transmission gear position feedback to the electronic control module.

In particular, a system consistent with the present invention may include: a driver interface module including a portion moveable to a plurality of desired gear positions; at least one sensor for providing an associated output signal in response to movement of the portion to at least one of the desired gear positions; and an actuator for positioning the transmission in at least one of the desired gear positions in response to the output signal. The driver interface module may include an axle that rotates with movement of the movable portion and a magnet disposed on an end of the axle, and the sensor may be a rotational position Hall effect sensor disposed adjacent the magnet. The magnet may be disposed eccentrically on the end of the axle to provide a linearly varying output signal having distinct voltage levels associated with each of the desired gear positions. The actuator may be configured to move the transmission to a respective one of the desired gear positions associated with each of the distinct voltage levels.

The system may also include a plurality of discrete position Hall effect sensors, and the movable portion of the interface module may be a shaft having a magnet disposed thereon. The magnet may be disposed adjacent a respective one of the discrete position Hall effect sensors when shaft is in each of the plurality of positions. Each of the discrete position Hall effect sensors may provide a distinct output signal associated with a respective one of the desired gear positions. The actuator may be configured to move the transmission to a respective one of the desired gear positions in response to each of the distinct output signals.

The actuator may include at least one electric motor for driving a gear train in response to the output signal. The gear train may include an output gear having output shaft for moving the transmission to the desired gear positions and a sensor gear, the sensor gear having a magnet disposed eccentrically on an end thereof. At least one Hall effect sensor may be disposed adjacent the magnet for providing an actuator output signal representative of the rotational position of the output shaft. The output signal may vary substantially linearly with rotation of the sensor gear. First and second electric motors and first and second Hall effect sensors may be used to provide redundancy.

BRIEF DESCRIPTION OF THE DRAWING

For a better understanding of the present invention, together with other objects, features and advantages, reference should be made to the following detailed description which should be read in conjunction with the following figures wherein like numerals represent like parts.

DETAILED DESCRIPTION OF THE INVENTION

Figure 1:
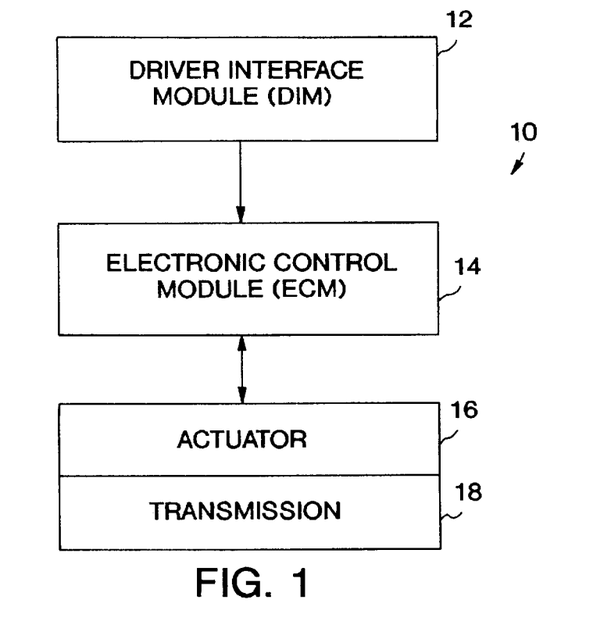
FIG. 1: is a block diagram of an exemplary transmission range selector system consistent with the present invention.

Referring to FIG. 1, there is shown a block diagram of an exemplary transmission range selector system 10 consistent with the present invention. As shown, the system includes a driver interface module 12 (hereinafter "DIM"), an electronic control module 14 (hereinafter "ECM"), and an actuator 16 mounted to an automobile transmission 18. For ease of explanation, the invention will first be described in broad general terms, with a more detailed description of the features and advantages to follow.

Generally, the DIM 12 includes a shift accessible to the driver. The shift may be positioned by the driver to designate a desired transmission gear position, e.g. "P" for park, "R" for reverse, "N" for neutral, "D" for drive, etc. The DIM 12 includes position-sensing electronics, e.g., Hall effect sensors, which provide an output signal to the ECM 14 that is representative of the desired transmission gear position selected by the driver at the DIM. The ECM, in turn, provides an output signal to the actuator 16.

The actuator 16 may be mounted directly to the automobile transmission 18, and, in response to the ECM output, changes the transmission gear position to the position designated by the driver. The actuator 16 also includes position-sensing electronics, e.g., Hall effect sensors, which provide an output to the ECM 14 corresponding to the actual transmission gear position. The ECM output signal may be provided to the actuator 16 on the basis of the desired transmission gear position set at the DIM 12 and the actual transmission gear position from the actuator 16.

Advantageously, the electromechanical system 10 requires significantly less space than the conventional purely mechanical transmission range selector systems. In one embodiment, the DIM and the ECM may be combined to form a single module that may be installed directly to an automobile dashboard. In many automobiles, this can provide significant additional space for other automobile systems.

Figure 2:
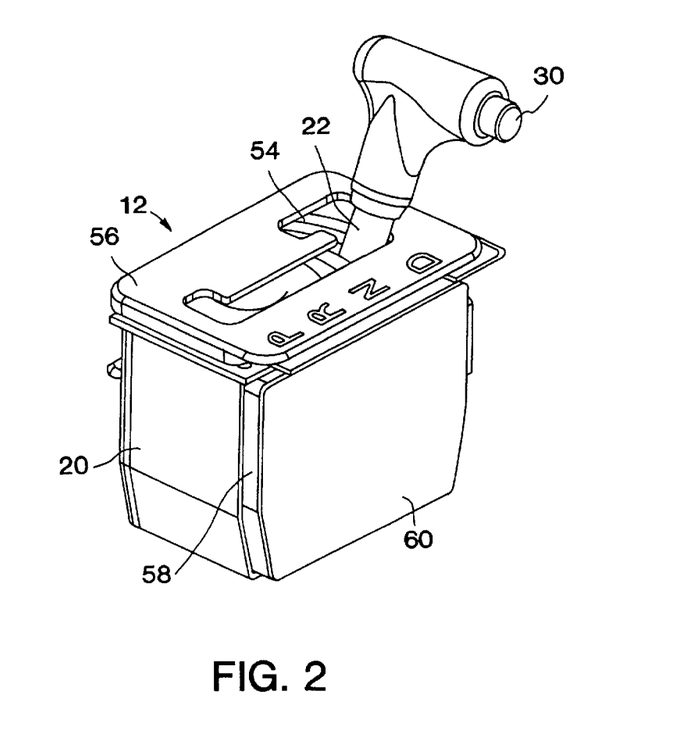
FIG. 2: is front right perspective view of an exemplary driver interface module consistent with the present invention.
Figure 3:
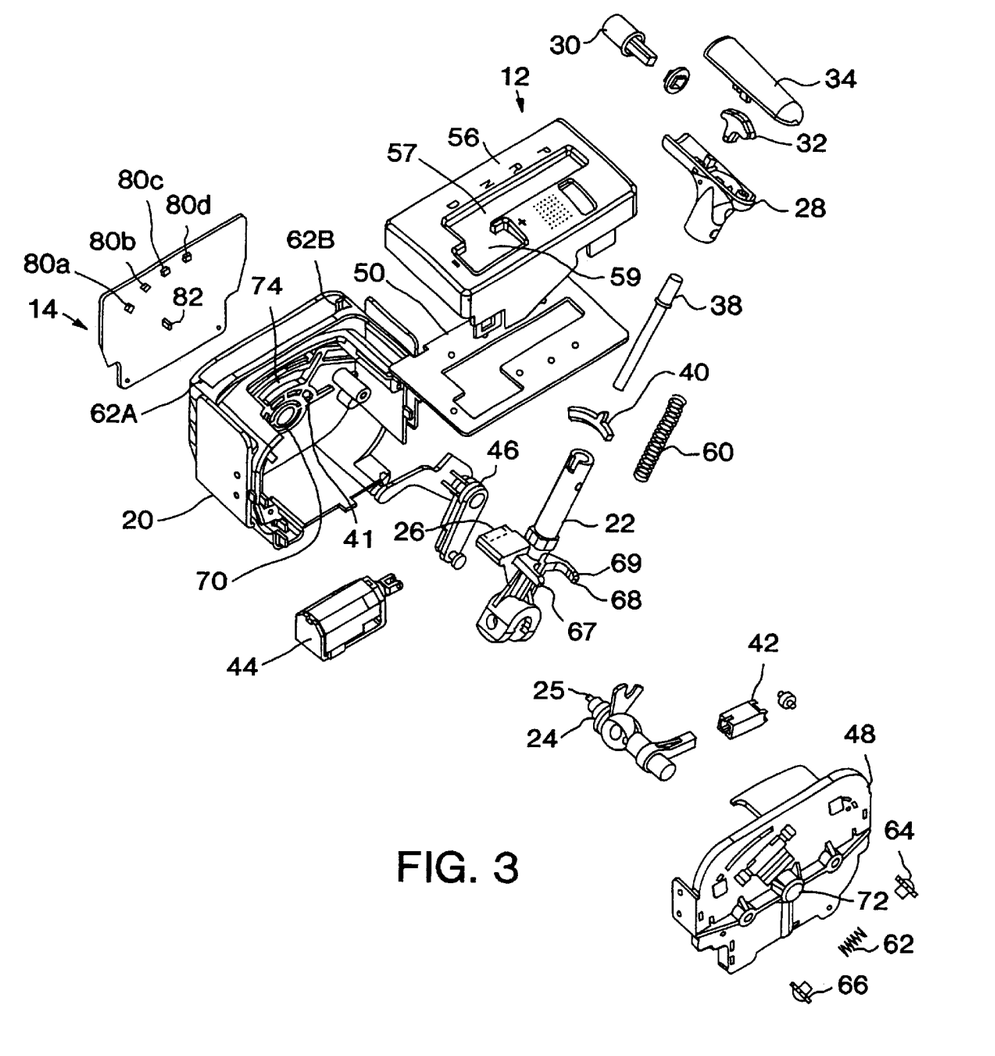
FIG. 3: is an exploded view of an exemplary driver interface module consistent with the present invention.

Turning now to FIGS. 2 and 3, there is shown an exemplary embodiment of a DIM 12 according to the invention. With reference particularly to the exploded view of FIG. 3, the DIM 12 generally includes: a housing 20; a shaft 22 including a tap up/down spring yoke portion 68; an axle 24 having a magnet 25 eccentrically mounted thereon; a magnet 26 mounted to the shaft 22; a handle housing 28; a button 30 and bell crank 32 assembly on the handle housing 28; a handle cover 34; a compression spring 60; a straw 38 which is depressed by the button 30 and bell crank 32 to release and engage a pawl 40 with pawl gates 41 on the housing 20; a detent assembly 42 for resisting motion of the shaft when in a desired position; a solenoid 44 operable through a linkage arm assembly 46 for maintaining the shaft 22 in a "Park" position when the vehicle is turned off; a right side cover 48; a shaft guide plate 50; a cover 56; an opening 74 in the housing 20 to allow the magnet 26 to extend therethrough, an opening 70 in the housing 20 to allow axle 24 and magnet 25 to extend therethrough; a tap up/down yoke 68; and a tap up/down spring 62 disposed between knobs 64 and 66. In addition, in the depicted embodiment, the ECM 14 is secured in the housing 20 in slots 62A and 62B. The ECM includes discrete position Hall effect sensors 80a–80d, rotational position Hall effect sensor 82, and control electronics, as will be described in detail below.

Figure 4:
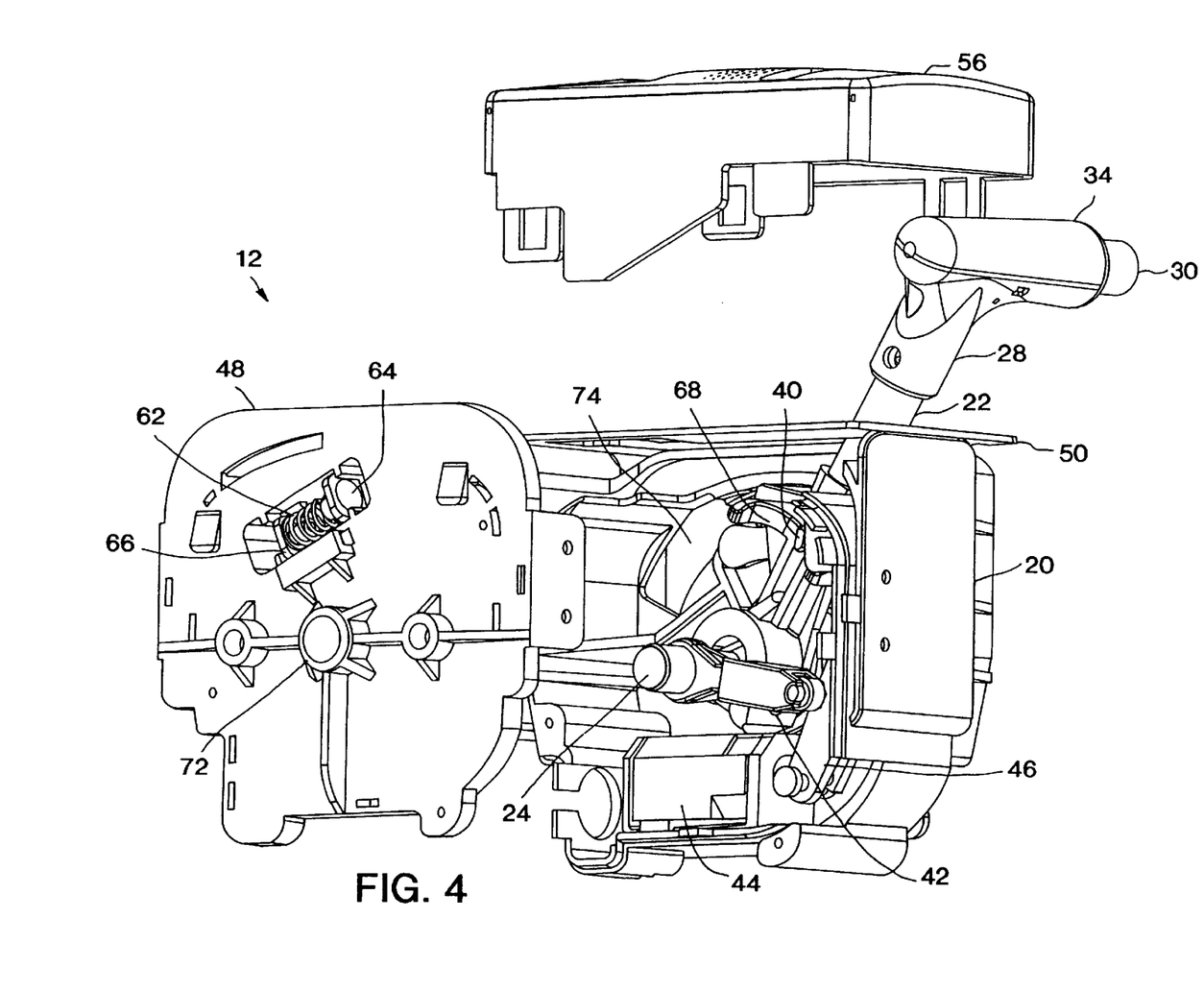
FIG. 4: is a front left perspective view of an exemplary driver interface module consistent with the present invention wherein a housing cover is removed in exploded view.
Figure 5:
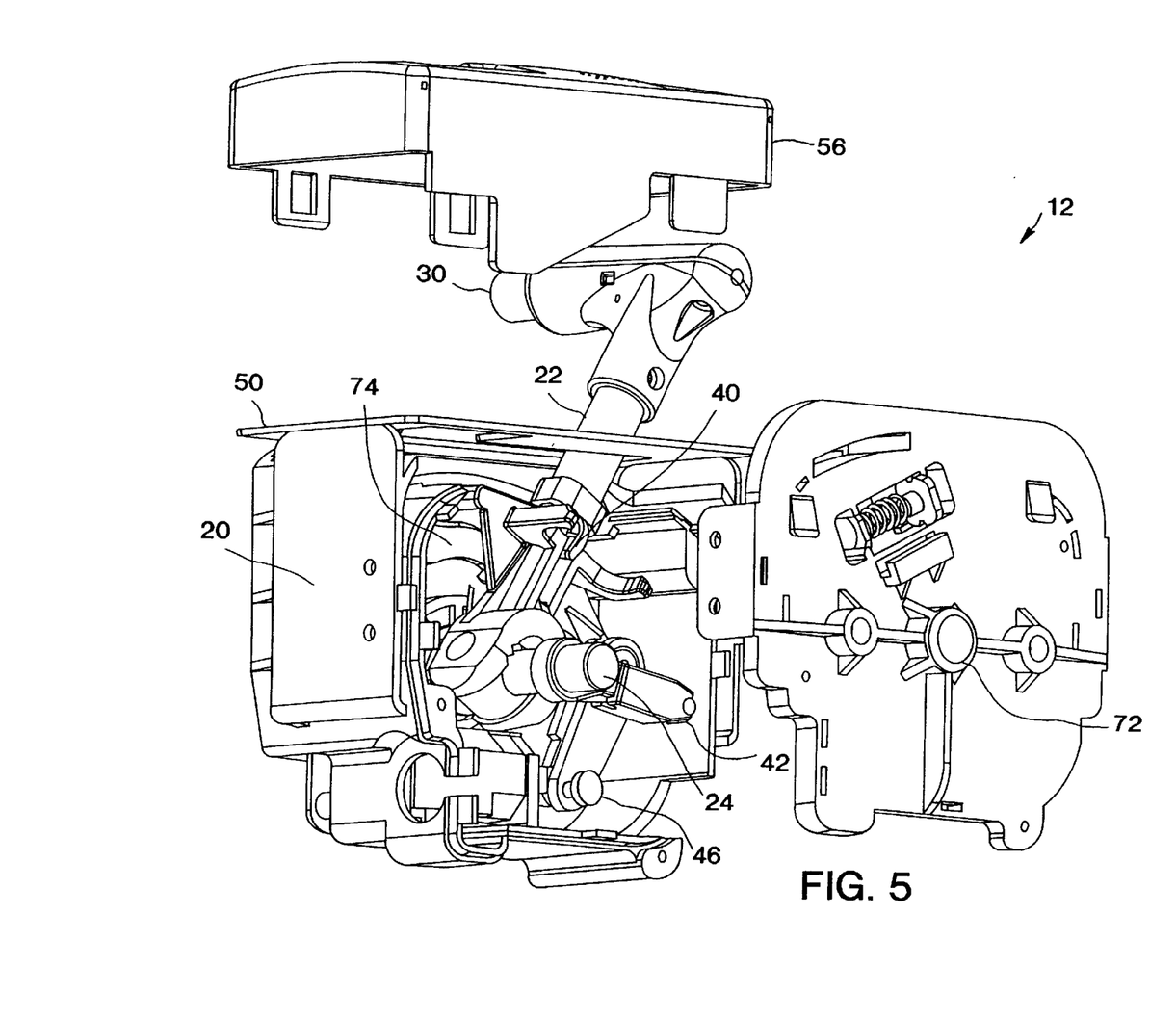
FIG. 5: is a rear right perspective view of an exemplary driver interface module consistent with the present invention wherein a top cover and a right side cover are removed in exploded view.

With reference also to FIGS. 4 and 5, an operator moves the shaft 22 to a desired gear position (e.g. "P" "R", "N", "D") as indicated on the cover 56 by depressing the button 30. The button 30 operates through the bell crank 32 to release the pawl 40 from a pawl gate 41 on the housing 20. With the pawl 40 released from the pawl gate 41, the shaft 22 may rotate with the axle 24, which has ends rotatingly disposed in openings 70 and 72 formed in the housing 20 and right side cover 48, respectively.

Rotation of the shaft 22 and axle is detented by the engagement of the detent assembly 42 with detent steps formed in right side cover 48. When the desired gear position is reached, the button 30 is released and the pawl 40 engages an associated pawl gate 41 to prevent further rotation of the shaft 22.

The shaft 22 is thus positionable at discrete locations between a "Park" position and a "Drive" position. When the shaft 22 is in the "Drive" position, the operator can urge the shaft in a sideward motion, causing the shaft to move from laterally from a discrete gear section 57 of the cover to a tap up/down 59 section of the cover. When the shaft moves into the tap up/down section, the system 10 enters a tap up/down transmission mode, which will be described in greater detail below. In this mode, first 67and second 69 arms the tap up/down yoke portion 68 are disposed adjacent contact knobs 66, 64, respectively for urging the shaft toward the center of the tap up/down section 59. Movement of the shaft in a forward or reverse direction thus occurs against the bias of the spring 62 coupled between the knobs 66,64.

In operation, when the shaft is positioned in the discrete gear section 57 of the cover, the shaft is positionable in a desired gear position. In illustrated exemplary embodiment, the desired gear position is communicated to the ECM 14 through Hall effect sensing, e.g. through a combination of discrete position Hall effect sensors 80a–80d and the rotational position Hall effect sensors 82. The Hall effect sensor 82 produces a linear output as the axle 24 is rotated, and the Hall effect sensors 80a–80d produce associated digital outputs as the shaft 22 is rotated. As shown, the Hall effect sensors 80a–80d, 82 may be mounted directly to the ECM. It will be understood by those skilled in the art, however, that other configurations are possible. For example, the ECM could be mounted in a remote position with the hall sensors 80a–80d and 82 mounted to a printed circuit board in the DIM.

Figure 6:
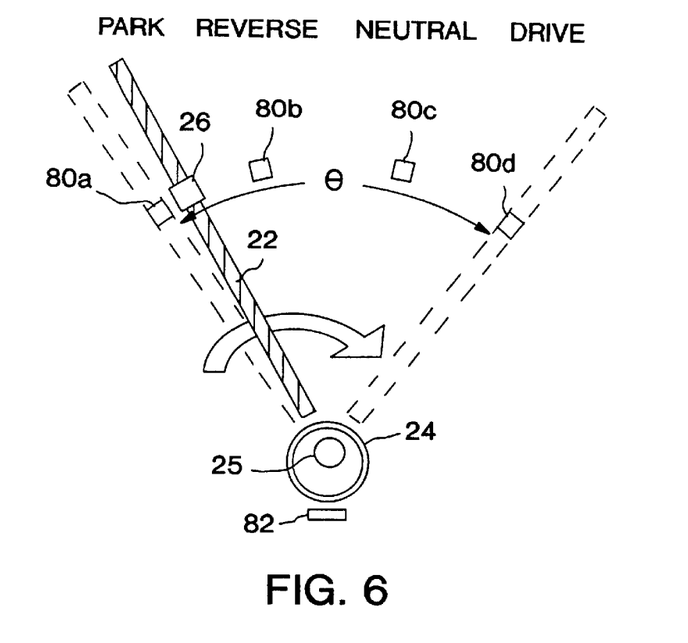
FIG. 6: illustrates in diagrammatic the relative positioning of rotational and discrete position Hall effect sensors to associated magnets in an exemplary embodiment consistent with the present invention.

Turning now to FIG. 6 the relative positioning of Hall effect sensors 80a–80d and 82 to magnets 26 and 25, respectively, is illustrated in diagrammatic form for an exemplary embodiment consistent with the invention. As shown, the magnet 25 is positioned eccentrically relative to the end of the axle 24. The sensor 82 may be positioned on the ECM to be disposed beneath the magnet 25. As is known, the output of a conventional Hall effect sensor is dependent on the strength and direction of the magnetic flux adjacent thereto. Those skilled in the art will recognize, therefore, that the magnet 25 need not be positioned precisely beneath the magnet 25, and that some distance between the magnet 25 and the sensor may be provided depending on the strength of the magnet 25 and the sensitivity of the sensor.

Figure 7A:
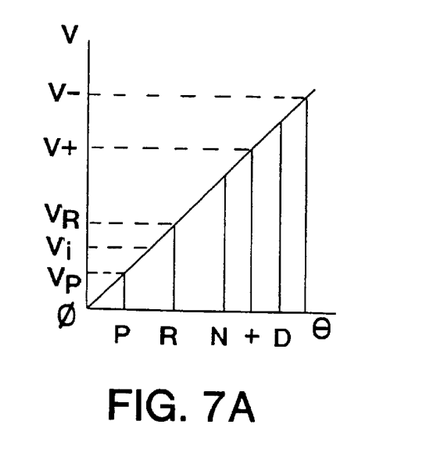
FIG. 7A: illustrates in diagrammatic form the output voltage of a rotational position Hall effect sensors vs. shaft position in an exemplary embodiment consistent with the present invention.

Due to the eccentric positioning of the magnet 25 on the axle 24, the sensor 82 provides a substantially linear output in the range of motion of the shaft 22. FIG. 7A, for example, illustrates the voltage output of the sensor 82 vs. shaft angle θ for an exemplary embodiment. The sensor output changes in a substantially linear fashion as the shaft is moved through a range of angles θ corresponding to desired gear positions (P, R, N, +, D, -). This linear output allows for highly accurate gear position tracking. In addition, the linear output allows for anticipation of desired gear position by the ECM, thereby allowing the ECM to energize the actuator for achieving the desired position even before the desired position is fully reached at the DIM.

For example, if the sensor output is at an intermediate voltage $V_i$ and is changing in a positive direction between a voltage $V_P$ corresponding to a Park position and a voltage $V_R$ corresponding to a Reverse position, then it may be assumed that the operator is moving to a Reverse position from Park. The ECM may thus energize the actuator to begin movement of the transmission to Reverse before the sensor output reaches $V_R$. In a similar manner, active braking of the actuator may also be achieved based on the linear hall output.

Redundant position sensing is provided via the magnet 26, which is positioned in a fixed location relative on the shaft, e.g., as shown in FIG. 3, and the sensors 80a–80d. The sensors 80a–80d are disposed at discrete positions on the ECM in an arc coinciding with the range of motion of the magnet 26 through an angle θ. Thus, the magnet 26 is positioned successively adjacent the sensors 80a, 80b, 80c, and 80d when the shaft is in the "Park", "Reverse", "Neutral", and "Drive" positions, respectively.

Figure 7B:
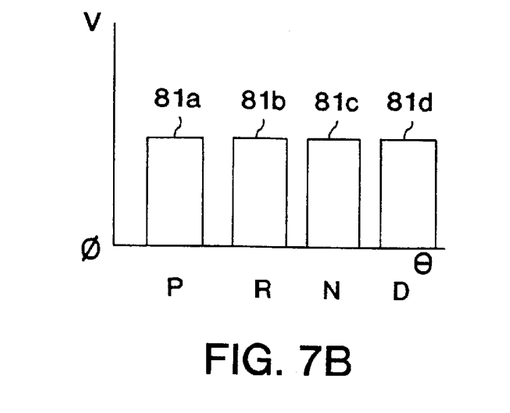
FIG. 7B: illustrates in diagrammatic form the output voltages of discrete position Hall effect sensors vs. shaft position in an exemplary embodiment consistent with the present invention.

Each sensor may be positioned such that it provides a digital "1" output only when the magnet 26 is positioned immediately adjacent thereto. Curves 81a, 81b, 81c, and 81d in FIG. 7B, for example, illustrate the sensor output voltage vs. shaft angle θ for the sensors 80a, 80b, 80c, and 80d, respectively. As shown, sensors 80a, 80b, 80c, and 80d provide a discrete output signal such as a digital "1" to the ECM only when the magnet is positioned a gear position associated with the sensor, thereby indicating that the shaft 22 is positioned at the desired gear position.

Thus, when a desired gear position is reached, both the hall sensor 82 and one of the hall sensors 80a–80d provide an output to the ECM indicating that the shaft 22 is in a specific desired gear position. Based on these output signals, the ECM energizes the actuator 16 to move the transmission from its present gear position to the gear position indicated by the sensors. Advantageously, in the event that either the hall sensor 80 or 82 fails, the remaining sensor will provide the necessary output to the ECM to achieve the desired gear position.

In the tap up/down transmission mode, the magnet 25 located on the axle 24 remains in close proximity to the Hall effect sensor 82 on ECM 14. As discussed above, the sensor 82 provides a linear output depending on the rotational position of the axle. In the tap up/down transmission mode, if the shaft is moved in a forward direction, e.g. toward "+" on the cover 56, then the output of the sensor 82 will move to a corresponding voltage, e.g. $V_+$ in FIG. 7A. In response to this output from the sensor, the ECM 14 signals the actuator 16 to shift the transmission 18 up one gear. The shaft 22 is then returned to a central position between "+" and "-" in the portion 59 of the cover under the bias of the spring 62 against the yoke 68. Each forward rotation of the shaft 22 causes the transmission 18 to shift up one gear until it reaches the highest gear. Likewise, rearward rotation, e.g. toward "-" on the cover 56, causes the sensor output to move to a corresponding voltage, e.g. $V_-$ in FIG. 7A. In response to this output the ECM 14 signals the actuator 16 to shift the transmission 18 down one gear. Each rearward rotation of the shaft 22 causes the transmission 18 to shift down one gear until it reaches the lowest gear.

The highly accurate position sensing provided by sensor 82 and magnet 25 and the redundancy provided by sensors 80a–80d and 82 thus provide significant advantages. Other sensor configurations are possible. For example, redundant sensing could be achieved through use of other sensor types, e.g. optical or magneto-resistive sensors. Hall effect sensing, however, provides a robust, accurate, and cost-effective system.

Figure 8:
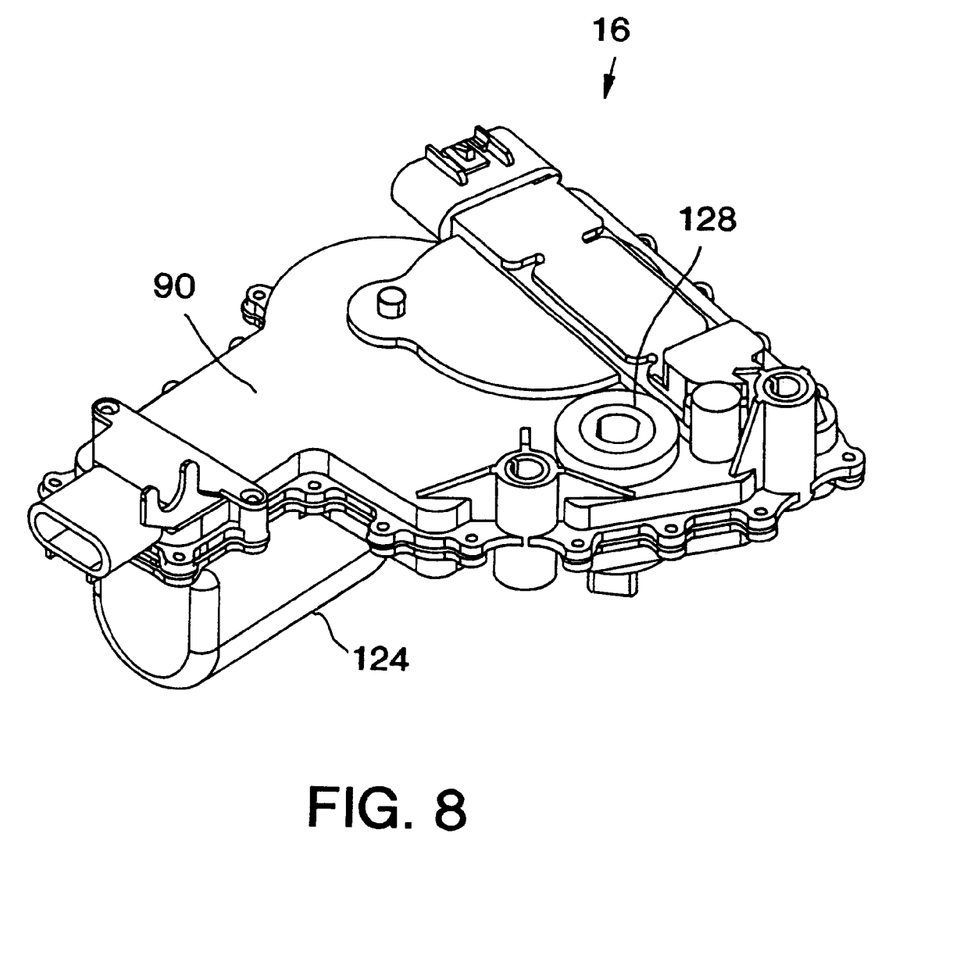
FIG. 8: is a perspective view of an exemplary actuator consistent with the present invention.
Figure 9:
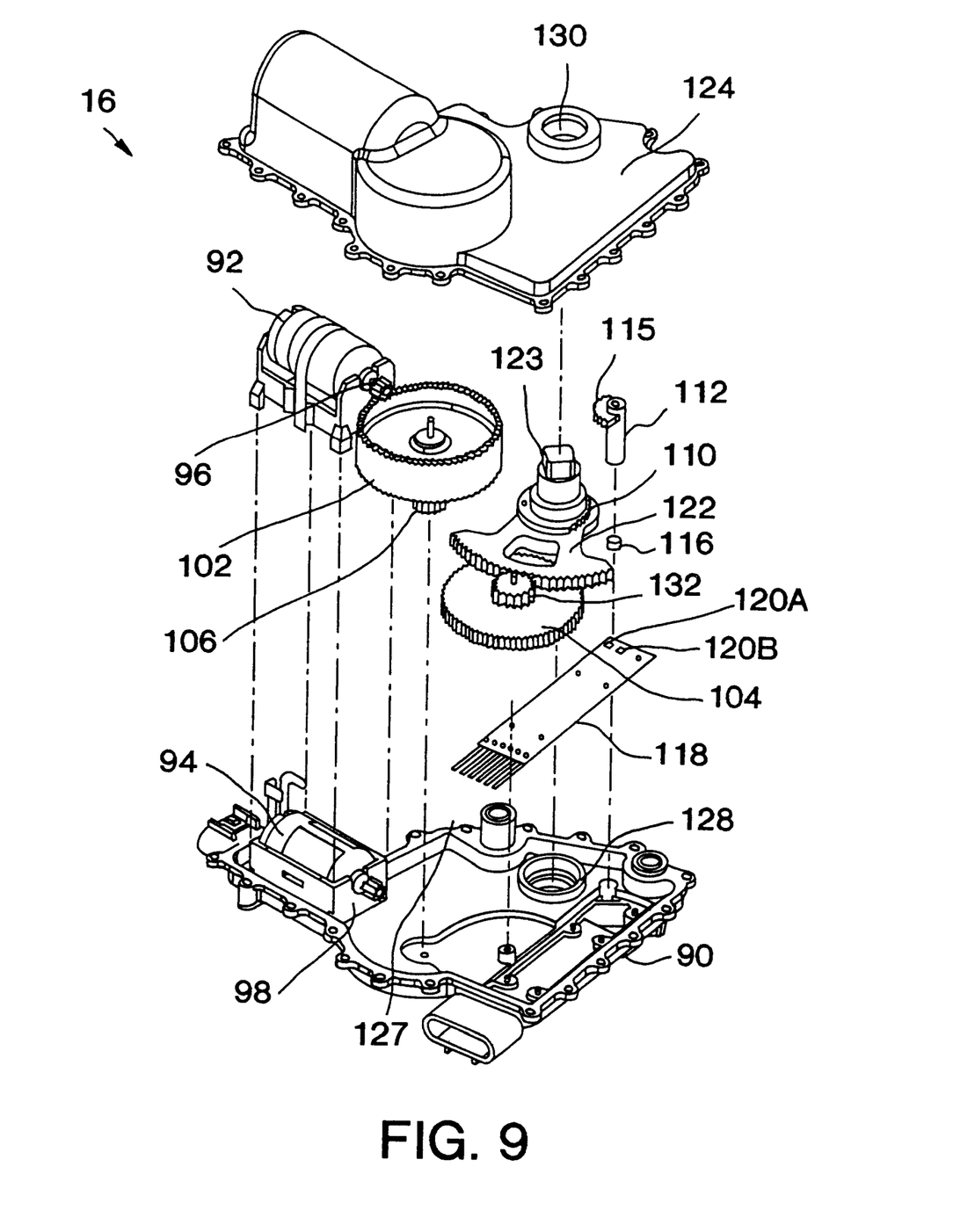
FIG. 9: is an exploded view of an exemplary actuator consistent with the present invention.
Figure 10:
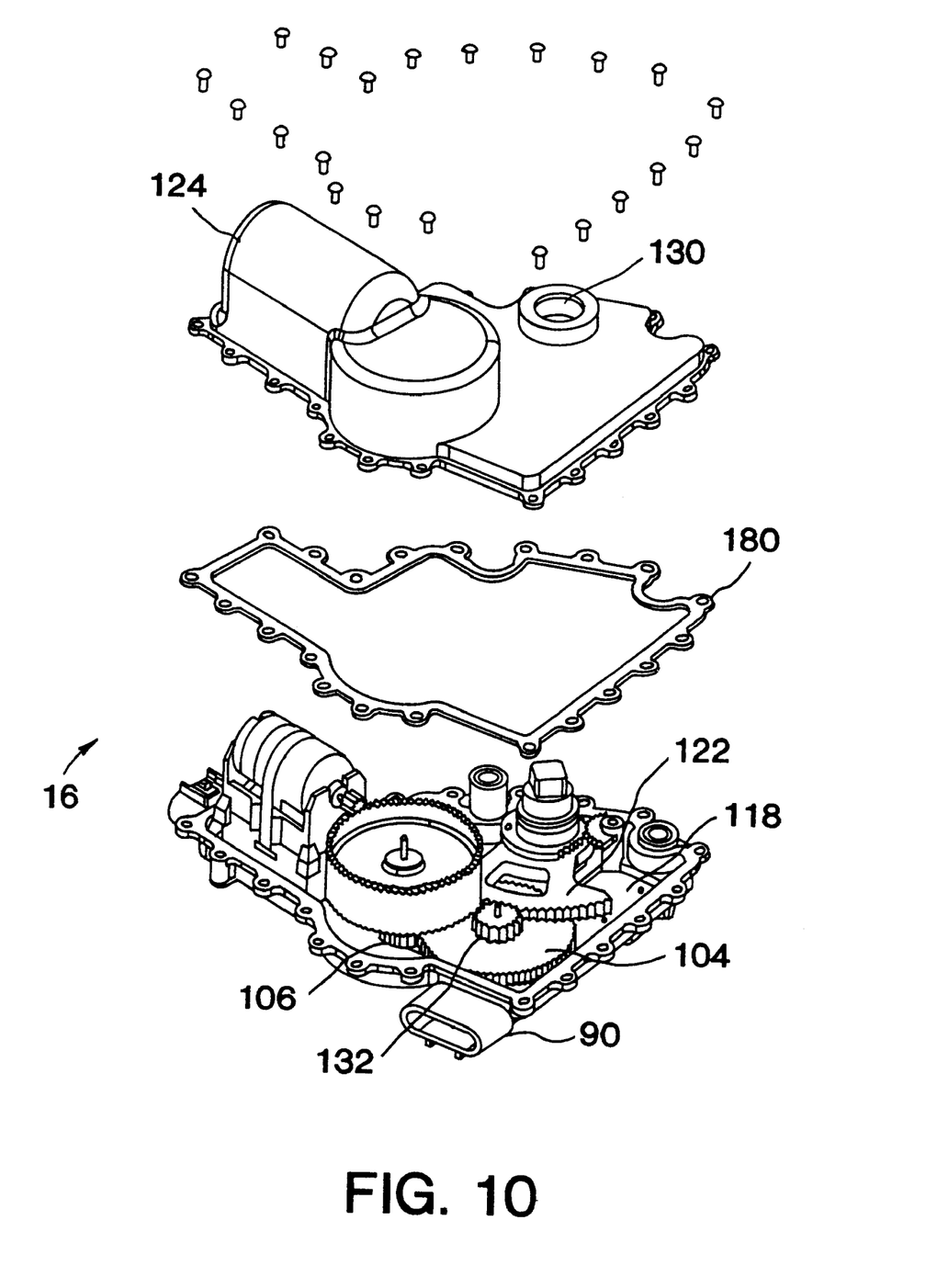
FIG. 10: is a partial exploded view of an exemplary actuator consistent with the present invention.

Turning now to FIGS. 8, 9, and 10 there is shown an exemplary actuator consistent with the present invention. As shown in exploded view in FIG. 9 and in partially assembled view in FIG. 10, an exemplary actuator 16 generally includes: a housing 90; first 92 and second 94 motors with pinion gears 96, 98, respectively; a compound face gear 102 driven by the motor pinion 96 and 98; a compound intermediate spur gear 104 for meshingly engaging pinion gear 106 on the compound face gear 102; a magnet 116 eccentrically coupled to a shaft 112 having a sector gear 115 thereon, the sector gear 115 driven by a sector gear 110 coupled to an output sector gear 122, the output sector gear 122 driven by pinion 132 on the spur gear 104; and a printed circuit board 118 with first 120A and second 120B Hall effect sensors. The output sector gear 122 for drives an actuator output shaft 123 that extends through opening 130 in the housing cover 124. A gasket 180 is provided between the housing and housing cover to seal the housing against entry of contaminants.

In the illustrated exemplary embodiment the actuator output shaft 123 is driven by the two DC motors 92, 94, through a gear train including the face gear 102, the compound gear 104, and the sector gear 122. The motor pinions 96 and 98 meshingly engage upper and lower teeth on the face gear 102 for driving the face gear in response to DC input from the ECM, e.g. through pins 127 on the ECM and associated connections (not shown) the motor windings. The ECM may control both the speed and direction of the motors.

The pinion 106 on the face gear 102 meshingly engages the compound spur gear 104. The pinion 132 on the compound spur gear 104 drives the sector gear 122 to rotate actuator output shaft 123 that is coupleable to the transmission selector shaft for achieving the desired gear position. The illustrated gear train provides a robust and efficient actuator system, which minimizes the possibility for mechanical failure. Those skilled in the art will, however, recognize that other gear train configurations may be provided in a manner consistent with the invention.

In an exemplary embodiment, the two motors may provide an output of 69.4 W (7.67 Nm at 92.1 rpm). Advantageously, this output is provided at a lower current draw for each unit of torque compared to a single motor, and the two motors are available at lower cost than a single larger motor. In addition, redundancy is provided in that the system will fully function, in a degraded mode, using only one of the motors, e.g., if one of the motors fails. A lower actuator profile is also possible using two motors as opposed to a single motor, thereby providing orientation flexibility. An output from the motors, e.g. stator current, can be provided to the ECM to detect when a motor fails. If one of the motors 92 or 94 fails, the ECM may generate an error message advising the operator to seek service.

Actuator position sensing is achieved via the Hall effect sensors 120A and 120B on printed circuit board 118 and the magnet 116, which is eccentrically positioned on the end of the shaft 112. The sector gear 110 drives the shaft 112 through meshing engagement of the sector gear 110 with the sector gear 115. The rotational position of the magnet 116 is, therefore, directly related to the rotational position of the output sector gear 122 and the position of the output shaft 123 coupled to the transmission.

To sense the rotational position of the magnet 116, the printed circuit board 118 is disposed in the housing with the Hall effect sensors 120A and 120B positioned adjacent, e.g. beneath, the magnet 116. As described above, the eccentric positioning of the magnet 116 on the end of the shaft 112 results substantially linear outputs from the Hall sensors 120A and 120B. Based on the linear output of Hall effect sensors 120A and 120B, the ECM 14 can accurately ascertain the actual transmission gear position. Two Hall effect sensors 120A and 120B are used to provide redundancy.

In a system consistent with the invention, the output shaft 123 of the actuator is provided for driving a rotatable transmission selector shaft of an automotive transmission 18. Those skilled in the art will recognize that the rotational position of the transmission selector shaft must be accurately controlled when selecting each gear in order to prevent premature wear of the transmission. The greater the difference between the actual rotational position of the selector shaft and an ideal position, the greater the wear. In the assembly of a system consistent with the invention to an automobile it is therefore necessary to calibrate the system to the transmission 18 to ensure that the desired gear position selected at the DIM corresponds to an actual gear position in the transmission 18.

Figure 11:
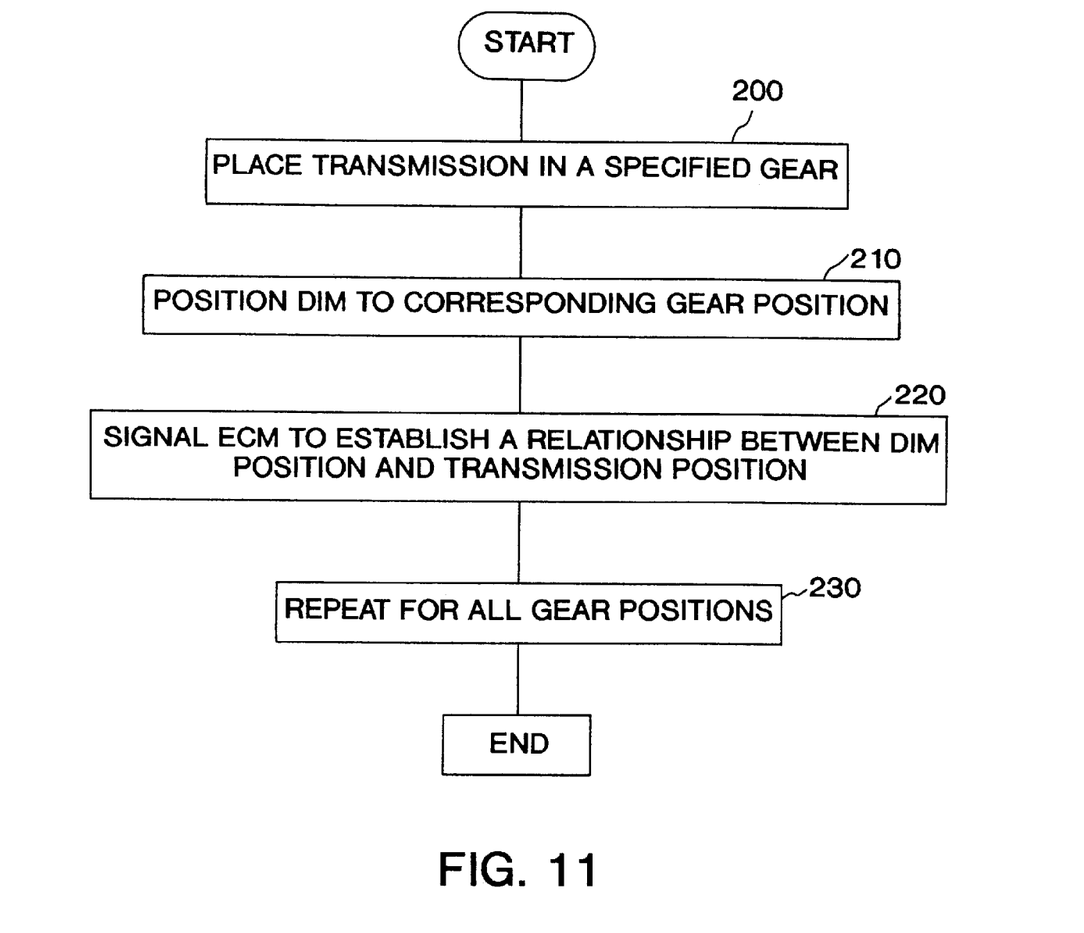
FIG. 11: is a flow chart illustrating a method of calibrating a system consistent with the present invention.

FIG. 11 illustrates an exemplary method for accurately calibrating a system 10 consistent with the invention with the rotational position of the transmission selector shaft. As shown, the transmission is placed 200 in a specified gear, for example "Park", with the actuator output shaft 123 coupled to the transmission selector shaft. The shaft 22 of the DIM is then positioned 210 to correspond to the specified gear at which the transmission is set. In the illustrated embodiment, this may be accomplished by actuating the button 30 and rotating the shaft 22 of the DIM to the corresponding rotational position, for example all the way forward to the "Park" position.

The ECM is then signaled 220 to establish a relationship between the DIM position and the actuator position. In the illustrated embodiment, the ECM may store into a memory the rotational position of the actuator output shaft 123 based on the output of the Hall sensors 120A and 120B and the position of the DIM shaft based on output of the Hall sensors 80a–80d and 82. The process may be repeated 230 for all gears. Alternatively, once the ECM has been signaled to establish one relationship between a DIM position and an actuator position, the ECM can establish a relationship for the other DIM positions and actuator positions, e.g. based on ideal parameters.

Figure 12:
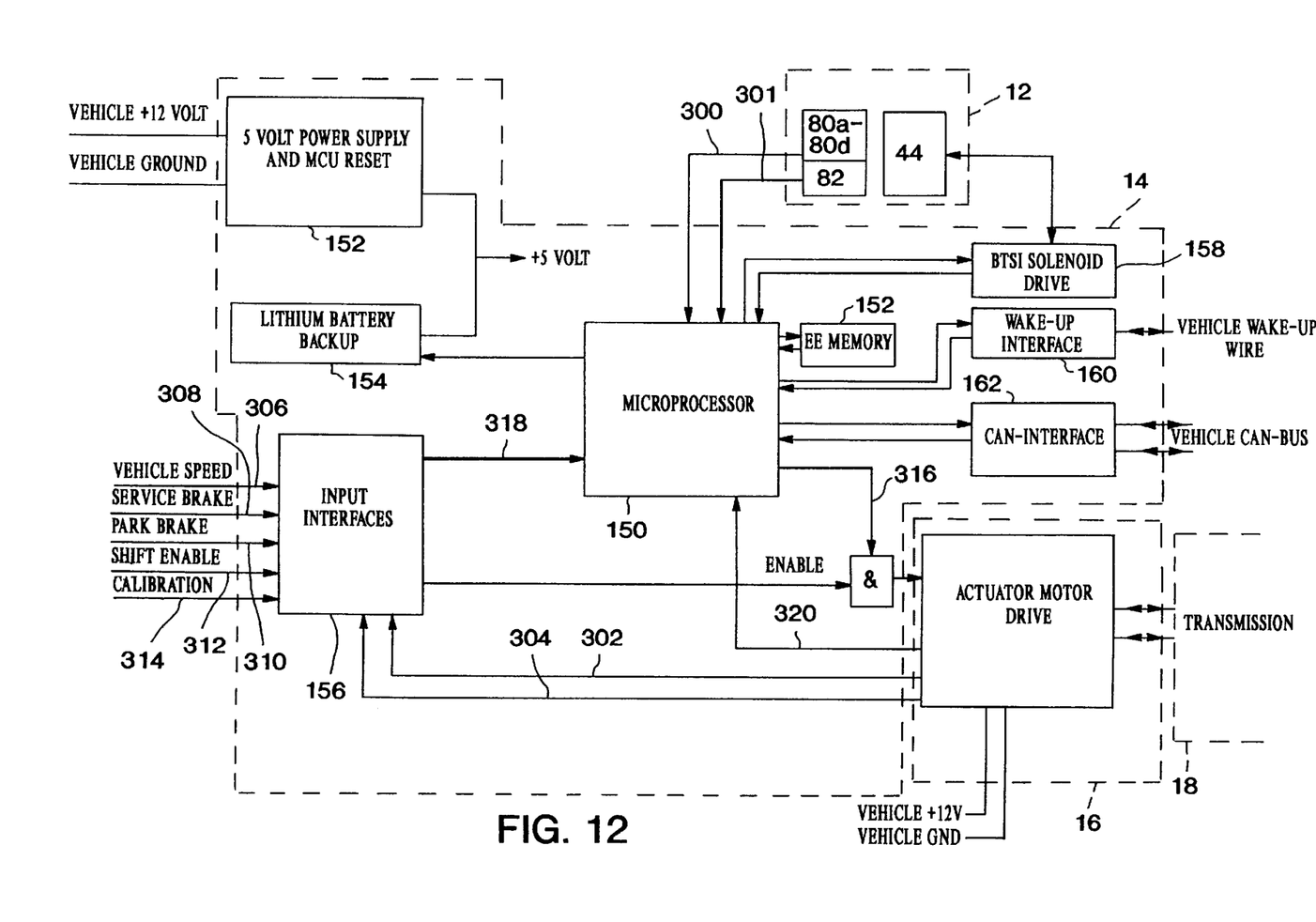
FIG. 12: is a block diagram illustrating an exemplary electronic control module for a transmission range selector system consistent with the present invention.

Turning now to FIG. 12, there is illustrated a block diagram of an exemplary ECM consistent with the invention. The ECM 14 may be mounted directly to the DIM 12 or in a remote location. In general, the ECM energizes the actuator 16 to achieve the desired gear position set at the DIM using the Hall effect outputs from the DIM 14 and the actuator 16. Those skilled in the art will recognize a variety of ECM configurations for achieving control of a transmission gear position consistent with the invention. It is to be understood, therefore, that the illustrated exemplary embodiment is provided by way of illustration, not of limitations.

In the illustrated embodiment, the ECM includes a microprocessor 150 for receiving outputs from sensors 80a–80d and 82 in the DIM 12 on lines 300 and 301, outputs from sensors 120A and 120B in the actuator 16 on lines 302, 304, and control inputs from other devices on lines 306–314 for controlling the ECM output to the actuator 16. In one embodiment, the microprocessor may be a Siemens C505CA controller with 8-bit enhanced 8051 kernal, 32K OTP RAM, 1.25K RAM, and up to 20 MHz operating frequency. The microprocessor may further include an 8 channel 10 bit A/D converter, integrated CAN 2.0B controller with 15 message objects, and a watchdog timer. A 256 byte external I2C EEPROM 152 may also be provided. The ECM further comprises a power supply 152, a battery backup 154, an input interface 156, a BTSI solenoid drive 158, a wake-up interface 160, and a CAN interface 162.

The power supply 152 may be a conventional 5VDC supply for providing a stable reference voltage from the vehicle's 12VDC battery. The battery backup provides power to the microprocessor 150 if power from the vehicle battery is unavailable. The BTSI (Brake Transmission Shift Interlock) solenoid drive 158 controls the solenoid in the DIM 12. The solenoid 44 prevents the shaft 22 in the DIM 12 from being rotated out of the "Park" position unless the operator depresses the brake pedal. The Wake-up interface 160 alerts the ECM 14 that the operator has inserted the key in the ignition and the ECM can now respond to received commands. The shaft 22 in the DIM 12 is also prevented from being rotated out of the "Park" position by the solenoid 44 unless the vehicle keys are in the ignition. The CAN (Controller Area Network) interface 162 is the main communications network between the microprocessor 150 and the vehicle main controller (not shown). The CAN is useful for performing remote diagnostics.

The input interface 156 receives vehicle speed input on line 306, service brake input on line 308, parking brake input on line 310, shift enable input on line 312, calibration input on line 314, and outputs from sensors 120A and 120B on lines 302 and 304, and provides signals representative of these inputs to the microprocessor 150 on line 318. The microprocessor 150 uses the "vehicle speed" input to prevent the transmission from being shifted into "Park" or "Reverse" when the vehicle is traveling above a predetermined speed. The microprocessor uses the "service brake" input to help slow the vehicle by down shifting when appropriate. The "park brake" input is used to prevent the vehicle from being driven when the parking brake is applied. The "shift enable" input is used to prevent shifting the transmission gear at an inappropriate time. Each of these inputs may be provided by components external to a system 10 consistent with the invention, and provided directly to the input interface. These inputs can alternatively be received over a vehicle's data bus. The "calibration" input is provided for establishing a relationship between the rotational position of the actuator 16 and the position of the DIM 14 as discussed above.

The ECM 14 controls the speed and direction of the motors 92 and 94 in the actuator 16, which in turn control the rotational position of the actuator output shaft 123. A desired gear position is set at the DIM and sensors 80a–80d provide an output representative of the desired position, as described above. Based on the sensor outputs and the signals provided at the input interface, the ECM provides an output to the motors on line 316 to move the transmission to the desired gear. The outputs of Hall sensors 120A and 120B are provided to the microprocessor 150 to indicate the actual gear position of the transmission. Once the desired gear position, as determined from sensors 80a–80d and 82, and the actual gear position, as determined from sensors 120A and 120B, match, the system is deemed to be in the desired gear position.

The illustrated ECM provides many advantageous features. It designed with solid-state technology, including no mechanical relays or switches, hall sensors on the board for reading DIM lever position, and an integrated H-bridge may be provided for driving the actuator. The H-bridge may be a Siemens BTS 780GP that is optimized for DC motor applications. The position of the actuator and the DIM lever may be calculated every 5 or 10 ms to ensure highly responsive control. The ECM may be configured to provide automatic re-calibration of the actuator and DIM due to aging. The ECM may also be configured to signal the operator to seek service if the ECM becomes disabled, e.g. if a motor stator current provided to the microprocessor on line 320 moves beyond a predetermined threshold indicating failure of one or more motors 92,94.

The embodiments that have been described herein, however, are but some of the several which utilize this invention and are set forth here by way of illustration but not of limitation. It is obvious that many other embodiments, which will be readily apparent to those skilled in the art, may be made without departing materially from the spirit and scope of the invention.

What is claimed is:

1. A system for controlling the gear position of an automotive transmission, comprising:
   a driver interface module including a portion moveable to a plurality of desired gear positions;
   at least one sensor for providing an associated output signal in response to movement of said portion to at least one of said desired gear positions; and
   an actuator for positioning said transmission in said at least one of said desired gear positions in response to said output signal,
   wherein said driver interface module includes an axle that rotates with movement of said portion and a magnet extending axially from an end of said axle, and wherein said sensor comprises a rotational position Hall effect sensor disposed adjacent said magnet.

2. A system according to claim 1, wherein said magnet is disposed eccentrically on said end of said axle.

3. A system according to claim 1, wherein said output signal varies substantially linearly with movement of said portion between first and second ones of said plurality of positions.

4. A system for controlling the gear position of an automotive transmission, comprising:
   a driver interface module including a portion moveable to a plurality of desired gear positions;
   at least one sensor for providing an associated output signal in response to movement of said portion to at least one of said desired gear positions; and
   an actuator for positioning said transmission in said at least one of said desired gear positions in response to said output signal,
   wherein said driver interface module includes an axle that rotates with movement of said portion and a magnet disposed on an end of said axle, and wherein said sensor comprises a rotational position Hall effect sensor disposed adjacent said magnet, and
   wherein said output signal varies substantially linearly with movement of said portion between each of said plurality of positions.

5. A system for controlling the gear position of an automotive transmission, comprising:
   a driver interface module including a portion moveable to a plurality of desired gear positions;
   at least one sensor for providing an associated output signal in response to movement of said portion to at least one of said desired gear positions; and
   an actuator for positioning said transmission in said at least one of said desired gear positions in response to said output signal,
   wherein said output signal has a distinct voltage level associated with each of said desired gear positions, and wherein said actuator is configured to move said transmission to a respective one of said desired gear positions associated with each said distinct voltage level.

6. A system for controlling the gear position of an automotive transmission, comprising:
   a driver interface module including a shaft moveable to a plurality of desired gear positions;
   at least one sensor for providing an associated output signal in response to movement of said portion to at least one of said desired gear positions; and
   an actuator for positioning said transmission in said at least one of said desired gear positions in response to said output signal,
   wherein said driver interface module includes an axle that rotates with movement of said shaft, a first magnet disposed on an end of said axle, and a second magnet disposed on said shaft, and
   wherein said at least one sensor comprises a rotational position Hall effect sensor disposed adjacent said first magnet, and a plurality of discrete position Hall effect sensors, said second magnet being disposed adjacent a respective one of said discrete position Hall effect sensors when shaft is in each of said plurality of positions.

7. A system according to claim 6,
   wherein said first magnet is disposed eccentrically on an end of said axle, and wherein said output signal of said rotational position Hall effect sensor has a distinct voltage level associated with each of said desired gear positions,
   wherein each of said discrete position Hall effect sensors provides a distinct one of said output signals associated with a respective one of said desired gear positions; and
   wherein said actuator positions said transmission in at least one of said desired gear positions in response to said rotational position output signal and said discrete position output signals.

8. A system for controlling the gear position of an automotive transmission, comprising:
   a driver interface module including a portion moveable to a plurality of desired gear positions;
   at least one sensor for providing an associated output signal in response to movement of said portion to at least one of said desired gear positions; and
   an actuator for positioning said transmission in said at least one of said desired gear positions in response to said output signal,
   wherein said actuator comprises: at least one electric motor for driving a gear train in response to said output signal, said gear train including an output gear having output shaft for moving said transmission to said at least one of said desired gear positions and a sensor gear, said sensor gear having a magnet disposed thereon; and
   at least one Hall effect sensor disposed adjacent said magnet for providing an actuator output signal representative of the rotational position of said output shaft.

9. A system according to claim 8, wherein said gear train includes an input gear coupled to first and second ones of said electric motors.

10. A system according to claim 8, wherein said actuator comprises first and second ones of said Hall effect sensors.

11. A system according to claim 8, wherein said magnet is disposed eccentrically on an end of said sensor gear.

12. A system according to claim 11, wherein said actuator output signal varies substantially linearly with rotation of said sensor gear.

13. A system for controlling the gear position of an automotive transmission, comprising:
   a driver interface module including a portion moveable to a plurality of desired gear positions;
   at least one sensor for providing an associated output signal in response to movement of said portion to at least one of said desired gear positions; and
   an actuator for positioning said transmission in said at least one of said desired gear positions in response to said output signal, said actuator comprising:
   first and second electric motors for driving an input gear of a gear train in response to said output signal, said gear train including an output gear having an output shaft for moving said transmission to said at least one of said desired gear positions.

14. A system according to claim 13, wherein said gear train includes a sensor gear having a magnet disposed eccentrically on an end thereof, and wherein said actuator further comprises at least one Hall effect sensor disposed adjacent said magnet for providing an actuator output signal representative of the rotational position of said output shaft.

15. An system according to claim 14, wherein said actuator comprises first and second ones of said Hall effect sensors.

16. A system according to claim 14, wherein said output signal varies substantially linearly with rotation of said sensor gear.

17. A system for controlling the gear position of an automotive transmission, comprising:
   a driver interface module including a shaft moveable to a plurality of desired gear positions and an axle that rotates with movement of said shaft, said axle having a first magnet disposed on an end thereof, and said shaft having second magnet disposed thereon;
   a rotational position Hall effect sensor disposed adjacent said first magnet for providing a rotational position output signal having a distinct voltage level associated with each of said desired gear positions,
   and a plurality of discrete position Hall effect sensors, said second magnet being disposed adjacent a respective one of said discrete position Hall effect sensors when shaft is in each of said plurality of positions, each said discrete position Hall effect sensor providing an associated discrete position output signal in response to movement of said shaft to an associated one of said desired gear positions; and
   an actuator for positioning said transmission in at least one of said desired gear positions in response to said rotational position output signal and said discrete position output signals.

18. A system according to claim 17, wherein said first magnet is disposed eccentrically on said end of said axle.

19. A system according to claim 17, wherein said rotational position output signal varies substantially linearly with movement of said shaft between first and second ones of said plurality of positions.

20. A system according to claim 17, wherein said rotational position output signal varies substantially linearly with movement of said shaft between each of said plurality of positions.

21. A system according to claim 17, wherein said actuator comprises:
   at least one electric motor for driving a gear train in response to said output signal, said gear train including an output gear having output shaft for moving said transmission to said at least one of said desired gear positions and a sensor gear, said sensor gear having a magnet disposed thereon; and
   at least one Hall effect sensor disposed adjacent said magnet for providing an actuator output signal representative of the rotational position of said output shaft.

22. A system according to claim 17, wherein said actuator comprises:
   first and second electric motors for driving an input gear of a gear train in response to said output signal, said gear train including an output gear having an output shaft for moving said transmission to said at least one of said desired gear positions.

23. A driver interface module for a system for controlling the gear position of an automotive transmission, comprising:
   a portion moveable to a plurality of desired gear positions and an axle that rotates with movement of said portion;
   and a magnet extending axially from an end of said axle for location adjacent a Hall effect sensor for providing an output representative of a rotational position of said axle.

24. A driver interface module according to claim 23, wherein said magnet is disposed eccentrically on said end of said axle.

25. A driver interface module for a system for controlling the gear position of an automotive transmission, comprising:
   a portion moveable to a plurality of desired gear positions and an axle that rotates with movement of said portion; and
   a magnet disposed on an end of said axle for location adjacent a Hall effect sensor for providing an output representative of a rotational position of said axle,
   wherein said portion comprises a shaft, and wherein a second magnet is disposed on said shaft for location adjacent a respective one of a plurality of discrete position Hall effect sensors when shaft is in each of said plurality of positions.

26. An actuator for a system for controlling the gear position of an automotive transmission, said actuator comprising:

at least one electric motor;

a gear train coupled said electric motor, said gear train including an output gear having output shaft for moving said transmission to a desired gear upon energization of said at least one electric motor and a sensor gear, said sensor gear having a magnet disposed thereon; and at least one Hall effect sensor disposed adjacent said magnet for providing an output signal representative of the rotational position of said output shaft.

27. An actuator according to claim 26, wherein said gear train includes an input gear coupled to first and second ones of said electric motors.

28. An actuator according to claim 26, said actuator comprising first and second ones of said Hall effect sensors.

29. An actuator according to claim 26, wherein said magnet is disposed eccentrically on an end of said sensor gear.

30. An actuator according to claim 29, wherein said output signal varies substantially linearly with rotation of said sensor gear.

31. An actuator for a system for controlling the gear position of an automotive transmission, said actuator comprising:

first and second electric motors; and a gear train having an input gear coupled said first and second electric motors, said gear train including an output gear having output shaft for moving said transmission to a desired gear upon energization of at least one of said first and second electric motors.

32. An actuator according to claim 31, wherein said gear train includes a sensor gear having a magnet disposed eccentrically on an end thereof, and wherein said actuator further comprises at least one Hall effect sensor disposed adjacent said magnet for providing an output signal representative of the rotational position of said output shaft.

33. An actuator according to claim 32, said actuator comprising first and second ones of said Hall effect sensors.

34. An actuator according to claim 32, wherein said output signal varies substantially linearly with rotation of said sensor gear.

\* \* \* \* \*